United States Patent Office 3,145,227
Patented Aug. 18, 1964

3,145,227
ORGANIC PHOSPHINE OXIDES AND METHODS
OF PREPARING SAME
Martin Grayson, Norwalk, and Patricia Tarpey Keough, Ridgefield, Conn., assignors to American Cyanamid Company, New York, N.Y., a corporation of Maine
No Drawing. Filed June 14, 1961, Ser. No. 116,987
2 Claims. (Cl. 260—465.8)

The present invention relates to unsaturated hydrocarbons and alkylene diphosphine dioxides and methods of preparing same. More particularly, the instant discovery concerns olefinically-unsaturated hydrocarbons, substituted or unsubstituted, and organophosphorus compounds of the formulae, respectively,

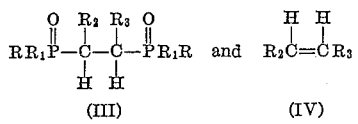

prepared by reacting a cyclic carbonic acid ester of the formula

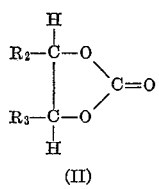

with a secondary phosphine or phosphine oxide of the formula

The symbols in the above formulae have the following meanings:

R and $R_1$ each represent substituted and unsubstituted alkyl having from 1 to 20 carbon atoms, substituted and unsubstituted cycloalkyl, such as cyclohexyl and cyclopentyl, substituted and unsubstituted mononuclear and dinuclear aryl, such as phenyl and naphthyl; R and $R_1$ combined may be the residue of a 2,4,6-trisecondaryalkyl-1,3-dioxa-5-phosphacyclohexane or a 2,4,6-triaryl-1,3 - dioxa-5 - substituted-phosphacyclohexane prepared as disclosed hereinafter; R and $R_1$ may be the same or different;
$n$ is selected from 0 and 1;
$R_2$ represents hydrogen, and substituted and unsubstituted alkyl having from 1 to 16 carbon atoms;
$R_3$ represents hydrogen, substituted and unsubstituted alkyl having from 1 to 16 carbon atoms and cycloaliphatic, the sum of $R_2$ and $R_3$ being in the range of 0 to about 16 carbon atoms, and said substituents for said alkyl moieties which $R_2$ and $R_3$, respectively, represent being, typically, hydroxy, cyano, lower alkoxy (e.g., ethoxy, butoxy), and like substituents which under the conditions of the reactions contemplated herein do not interfere to any substantial degree with the preparation of the desired alkylene diphosphine dioxides.

When (I) above, is a secondary phosphine oxide, no unsaturate of the Formula IV, above, results.

Typical embodiments of the instant discovery are the following:

(A)

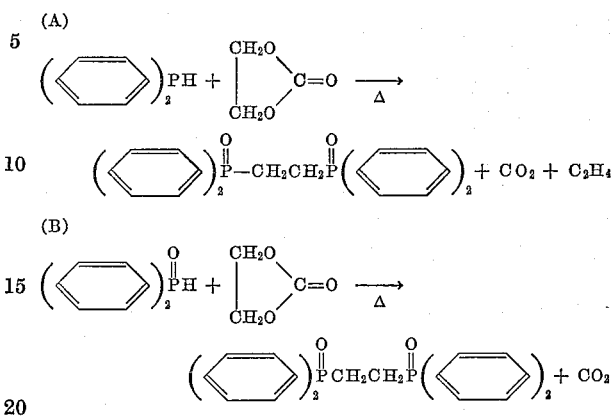

(B)

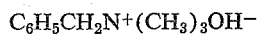

This is an unusual reaction since it would be expected that 2-hydroxyethylphosphine would be the product of reactions A and B, respectively.

The reactions contemplated herein are generally carried out at a temperature in the range of about 50° C. to about 250° C., preferably 150° C. to 250° C. when $R_2$ and/or $R_3$ are other than hydrogen. Furthermore, these reactions may be carried out at atmospheric or sub-atmospheric pressures, preferably atmospheric.

It has been found, pursuant to the instant discovery, that under certain circumstances a catalyst is best employed. Many and varied catalysts are suitable, such as metallic copper powder, inorganic and organic bases. Typical inorganic bases are alkali and alkaline earth metal hydroxides or carbonates, and the like, such as NaOH, KOH, LiOH, Ca(OH)$_2$, Ba(OH)$_2$, NH$_4$OH, Mg(OH)$_2$, Na$_2$CO$_3$, CaCO$_3$, K$_2$CO$_3$, CaO, etc.

Typical organic bases are the trialkyl amines, such as triethylamine and tributylamine, heptamethylbiguanide, lutidine, substituted ammonium hydroxide (e.g.

$$C_6H_5CH_2N^+(CH_3)_3OH^-$$

benzyltrimethyl ammonium hydroxide), etc.

The secondary phosphines and secondary phosphine oxides of the present invention react with the cyclic carbonate ester reactants in stoichiometric quantities, e.g., 2 molar equivalents of the phosphine reactant with 3 molar equivalents of the cyclic carbonate ester or 1 molar equivalent of the phosphine oxide reactant with 2 molar equivalents of cyclic carbonate ester. If desired, an excess of the secondary phosphine oxide relative to the cyclic carbonate ester may be employed. When the reactant is a secondary phosphine, an excess of cyclic carbonate ester relative to the secondary phosphine is preferred. The sequence of addition of these reactants is not critical.

Typical secondary phosphines and phosphine oxides within the purview of the instant discovery are those corresponding to Formula (I) above of which the following are illustrative: diphenylphosphine; bis(4-chlorophenyl)phosphine; dibutylphosphine; didodecylphosphine; bis(2-phenylethyl)phosphine; dicyclohexylphosphine; bis(3-ethylhexyl)phosphine; bis(2,4,4 - trimethylpentyl)phosphine; bis(3 - chloropropyl)phosphine; bis(2 - butenyl)- phosphine; ethylhexylphosphine; dioctylphosphine; diisooctylphosphine; bis(3-methoxycyclohexyl)phosphine; bis-(3-ethoxycyclopentyl)phosphine; 2,4,6-tris(3-heptyl)-1,3-dioxa-5-phosphacyclohexane; 2-(3-hexyl) - 4,6-diisopropyl-1,3 - dioxa-5 - phosphacyclohexane; 2,4,6 - triphenyl - 1,3-dioxa - 5 - phenylphosphacyclohexane; 2,4,6-tri(4-chlorophenyl)-1,3-dioxa-5(2 - cyanoethyl)phosphacyclohexane; 2,4,6-tri(1-naphthyl)-1,3-dioxa-5(4 - methylphenyl)phosphacyclohexane; bis(2 - phenoxyethyl)phosphine; bis(2-aminoethyl)phosphine; bis(3 - hydroxypropyl)phosphine; bis(2 - butoxyethyl)phosphine; bis(carbamylethyl)phosphine; bis(2-chloroethyl)phosphine; bis(hydroxymethyl)-phosphine; bis(1-hydroxyhexyl)phosphine; bis(3 - ethylthiopropyl)phosphine; bis(3 - carbethoxypropyl)phosphine; bis(4-aminophenyl)phosphine; bis[2 - (4-aminophenyl)ethyl]phosphine; and the like, and the oxides of these, as well as mixtures of all of these reactants, such as a reactant mixture of dioctylphosphine and and diisooctylphosphine, and similar mixtures.

It follows from this list that substituents contemplated for R and $R_1$ just above are alkoxy, halogen, aryloxy (such as phenoxy), aralkoxy, alkaryloxy, aminoaryl, hydroxyl, carbamyl, acyloxy, carbalkoxy, aryl, and other like substituents which are non-oxidizing under the conditions of the reaction.

The 2,4,6-trisecondaryalkyl-1,3-dioxa-5-phosphacyclohexanes contemplated herein are prepared as described in copending U.S. application Serial No. 766,656, filed October 13, 1958, now U.S. Patent 2,984,683, which is incorporated herein by reference. The 2,4,6-triisopropyl-1,3-dioxa-5-phosphacyclohexane secondary phosphine reactant referred to above, for example, is prepared as shown in Example A, infra.

EXAMPLE A 2,4,6-Triisopropyl-1,3-Dioxa-5-Phosphacyclohexane

A one-liter, three-necked reactor flask is equipped with a gas inlet tube, an addition funnel, a mechanical stirrer and a gas bubbler device so disposed that all exit gases from the flask pass upwardly therethrough, the bubbler device comprising a column containing a two-inch head of water. The reactor flask is charged with a solution mixture at ambient temperature (21° C.–23° C.) of 200 milliliters of a concentrated aqueous solution of hydrochloric acid containing 37.7 percent HCl by weight and 200 milliliters of tetrahydrofuran.

Subsequently, the flask system and the charge are purged substantially free of oxygen-containing gas with nitrogen gas, and then a total of 108 grams (1.5 moles) of isobutyraldehyde and 17 grams (0.5 mole) of gaseous phosphine, at ambient temperature (21° C'–23° C.), is slowly and continuously introduced into the charge over a period of 30 minutes.

A reaction mixture results which, after settling for 30 minutes, leaves an upper organic layer or phase which is separated from the remaining reaction mixture and distilled under reduced pressure. A total of 91 grams (78 percent of theory) of product 2,4,6-triisopropyl-1,3-dioxa-5-phosphacyclohexane is thus collected as a colorless liquid having a boiling point of 100° C.–101° C. at 8 millimeters pressure. The material has a pungent odor and a refractive index of $n_D^{25}$=1.4602.

Analysis.—Calculated for $C_{12}H_{25}O_2P$: C, 62.04; H, 10.85; P, 13.34. Found: C, 61.82; H, 10.78; P, 13.26.

Other 2,4,6 - trisecondaryalkyl-1,3-dioxa-5-phosphacyclohexanes are similarly prepared by reacting the corresponding alkyl aldehyde, having an alkyl branch in the alpha position, with phosphine in the presence of an aqueous mineral acid. The alkyl aldehyde reactants may be represented by the formula $R_xR_yCCHO$, in which $R_x$ and $R_y$ each represent alkyl having 1 to 10 carbon atoms. If desired, a water-soluble, inert organic solvent may be employed, such as tetrahydrofuran, dioxane, a lower aliphatic monohydric alcohol, the dimethyl ether of ethylene glycol, and the like.

The 2,4,6-triaryl-1,3-dioxa-5-substituted-phosphacyclohexane reactants referred to hereinabove are similarly prepared beginning with an aromatic aldehyde and a primary phosphine selected from cyanoethylphosphine, phenylphosphine and substituted phenylphosphine, such as 4 - methylphenylphosphine, 2,4 - dimethylphenylphosphine, 4-chlorophenylphosphine, 3-nitrophenylphosphine, 4 - hydroxyphenylphosphine, 4 - ethoxyphenylphosphine, and the like. Typical aromatic aldehyde reactants are benzaldehyde, 4-tolualdehyde, 4-chlorobenzaldehyde, 2,4-dichlorobenzaldehyde, 4-methoxybenzaldehyde, and the like.

Examples B and C below disclose typical preparations of these reactants:

EXAMPLE B 2,4,6-Triphenyl-1,3-Dioxa-5-Phenylphosphacyclohexane

To a solution of 6.2 grams (0.056 mole) of phenylphosphine dissolved in 40 milliliters of acetonitrile is added 18.0 grams (0.17 mole) of benzaldehyde and 1 milliliter of concentrated hydrochloric acid. The solution is allowed to stand at 25° C. for 24 hours and the solid that precipitates is filtered and washed with ether. The product is collected to give 12.2 grams (53 percent by weight of the amount theoretically producible) of 2,4,6-triphenyl-1,3-dioxa-5-phenylphosphacyclohexane, melting point 188° C.–192° C. A purer sample is prepared by recrystallization from acetonitrile, melting point 192° C.–198° C.

Analysis.—Calculated for $C_{27}H_{23}O_2P$: C, 79.01; H, 5.65; P, 7.55. Found: C, 79.19; H, 5.66; P, 7.95.

EXAMPLE C 2,4,6-Tri(p-Chlorophenyl)-1,3-Dioxa-5-(2-Cyanoethyl) Phosphacyclohexane Mono(2-cyanoethyl)phosphine 17.4 grams (0.2 mole) is added to a solution of 56.4 grams (0.4 mole) of p-chlorobenzaldehyde in 100 milliliters of tetrahydrofuran and 17 milliliters of concentrated HCl. After stirring for 1 hour at 30° C. the solvent is removed under vacuum to leave a viscous liquid. The syrup is triturated with water and ethanol is added to precipitate a white solid. The solid is collected and dried to give 27 grams (41 percent by weight of the amount theoretically producible when based on the phosphine) of 2,4,6-tri(p-chlorophenyl)-1,3-dioxa-5(2 - cyanoethyl)phosphacyclohexane. Recrystallization from ethanol gives an analytical sample, melting point 197° C.–200° C.

Analysis.—Calculated for $C_{24}H_{19}O_2PCl_3N$; C, 58.74; H, 3.90; N, 2.85; P, 6.31; Molecular Weight 490.8. Found: C, 57.97; H, 3.68; N, 2.86; P, 6.30; Molecular Weight 480.

Typical cyclic carbonate esters of the formula

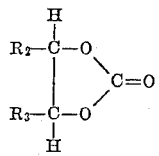

are ethylene carbonate, propylene carbonate, phenylethylene carbonate, 6-ethoxy-1,2-hexylene carbonate, 6-cyano-1,2-hexylene carbonate, 3-butoxy-1,2-propylene carbonate, 2,3-butylene carbonate, 1,2-cyclohexylene carbonate, cyclohexylethylene carbonate, and the like. In addition, as will be seen hereinafter, unsaturated carbonates (e.g. vinylene carbonate) wherein $R_2=R_3=O$ yield corresponding alkylene diphosphine dioxides.

If desired, reactions of the type contemplated herein may be carried out in the presence of an inert organic solvent. Typical solvents are aliphatic alcohols, such as isopropanol, n-butanol, n-octanol, and other similar solvents which under the conditions of the reaction do not react with the reactants or their products.

The present invention will best be understood from the following examples:

mixtures, are identified by infrared spectroscopy and microanalysis.

TABLE I

| Example | Reactants | | Reaction conditions | | | Products | |
|---|---|---|---|---|---|---|---|
| | Phosphines | Carbonate | Temperature, °C. | Solvent | Catalyst | | |
| I | $(C_6H_5)_2PH$ | Ethylene | 210 | None | None | $(C_6H_5)_2\overset{O}{\overset{\|}{P}}CH_2CH_2\overset{O}{\overset{\|}{P}}(C_6H_5)_2$ | $H_2C=CH_2$. |
| II | $(C_6H_5)_2PH$ | do | 82.4 | Isopropanol | H.M.B.[a] | $(C_6H_5)_2\overset{O}{\overset{\|}{P}}CH_2CH_2\overset{O}{\overset{\|}{P}}(C_6H_5)_2$ | $H_2C=CH_2$. |
| III | $(C_6H_5)_2PH$ | Propylene | 185 | None | None | $(C_6H_5)_2\overset{O}{\overset{\|}{P}}-CH_2\overset{CH_3O}{\overset{\|}{CH}}\overset{}{\overset{\|}{P}}(C_6H_5)_2$ | $H_3CC=CH_2$ |
| IV | $(C_6H_5)_2\overset{O}{\overset{\|}{P}}H$ | Vinylene | 120-160 | do | H.M.B | $(C_6H_5)_2\overset{O}{\overset{\|}{P}}CH_2CH_2-\overset{O}{\overset{\|}{P}}(C_6H_5)_2$ | None. |
| V | $(C_6H_5)_2\overset{O}{\overset{\|}{P}}H$ | Ethylene | 200 | do | None | $(C_6H_5)_2\overset{O}{\overset{\|}{P}}CH_2CH_2\overset{O}{\overset{\|}{P}}(C_6H_5)_2$ | Do. |
| VI | $(C_6H_5)_2\overset{O}{\overset{\|}{P}}H$ | Propylene | 82.4 | Isopropanol | H.M.B | $(C_6H_5)_2\overset{O}{\overset{\|}{P}}CH_2\underset{CH_3}{\overset{}{\overset{\|}{CH}}}\overset{O}{\overset{\|}{P}}(C_6H_5)_2$ | Do. |
| VII | $(C_4H_9)_2PH$ | Ethylene | 160 | None | None | $(C_4H_9)_2\overset{O}{\overset{\|}{P}}-CH_2CH_2\overset{O}{\overset{\|}{P}}(C_4H_9)_2$ | $H_2C=CH_2$. |
| VIII | $(NCCH_2CH_2)_2\overset{O}{\overset{\|}{P}}H$ | do | 180 | do | do | $(NCH_2CH_2C)_2\overset{O}{\overset{\|}{P}}CH_2CH_2\overset{O}{\overset{\|}{P}}(CH_2CH_2CN)_2$ | None. |

[a] Heptamethylbiguanide.

Examples I–VIII are carried out by mixing the secondary phosphine or phosphine oxide at room temperature under nitrogen with a two-fold molar excess of cyclic carbonate (likewise, vinylene carbonate) relative to the phosphine or phosphine oxide reactant. This mixture is heated with the reaction system open only to a gas burette. At temperatures varying from 120° C.–150° C., an exotherm occurs, accompanied by the vigorous evolution of gas. When this evolution subsides, the reaction mixture is cooled, washed with cold water to remove unreacted carbonate and extracted with either benzene or chloroform. The organic extract is dried, filtered and concentrated to yield crystalline alkylene bis(phosphine oxides) which, after recrystallization from benzene-hexane In Examples II and VI, for instance, which are run in solution, a 2:1 ratio of cyclic carbonate to secondary phosphine (or secondary phosphine oxide) is mixed with sufficient solvent to make the phosphine concentration 3 to 4 molar and heated to the reflux temperature of the solvent.

In Examples II, IV and VI in which heptamethylbiguanide is used as a catalyst, 0.5 milliliter of it is added at reflux temperature. Refluxing is continued until the theoretical volume of gas for each reaction has been evolved. The mixture is then cooled, treated with hexane and the viscous syrup which separates from solution is worked up as described.

TABLE II

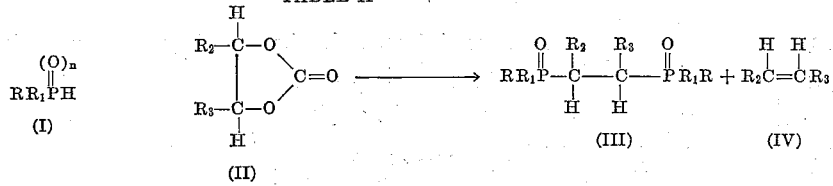

| Example | Reactants | | Reaction conditions | | | Products |
|---|---|---|---|---|---|---|
| | Phosphine | Carbonate[a] | Temperature, °C. | Solvent | Catalyst | |
| IX | Bis(4-chlorophenyl)phosphine | 7 | 150 | None | None | (b). |
| X | Dibutylphosphine | 4 | 80 | Isopropanol | H.M.B.[c] | |
| XI | Didodecylphosphine oxide | 6 | 200 | None | $K_2CO_3$ | (b). |
| XII | Bis(2-phenylethyl)phosphine | 3 | 200 | do | Cu powder | |
| XIII | Bis(2,4,4-trimethylpentyl)phosphine | 8 | 250 | do | KOH | |
| XIV | Bis(2-butenyl)phosphine | 5 | 150 | do | 2,6-lutidine | |
| XV | Dioctylphosphine oxide | 9 | 200 | do | BaO | |
| XVI | Bis(3-ethoxycyclopentyl)phosphine | 1 | 175 | do | $Ca(OH)_2$ | |
| XVII | 2,4,6-tris(3-heptyl)1,3-dioxa-5-phosphacyclohexane oxide | 1 | 200 | do | Cu powder | |
| XVIII | 2,4,6-tri(4-chlorophenyl)1,3-dioxa-5(2-cyanoethyl)phosphacyclohexane | 1 | 200 | do | do | |

See footnotes at end of table.

TABLE II—Continued

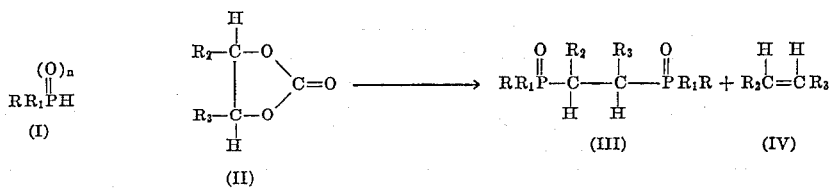

| Example | Reactants | | Reaction conditions | | | Products |
|---|---|---|---|---|---|---|
| | Phosphine | Carbonate [a] | Temperature, °C. | Solvent | Catalyst | |
| XIX | 2,4,6-tri(1-phenyl)-1,3-dioxa-5 (4-methylphenyl)phosphacyclohexane. | 1 | 200 | None | CU powder | |
| XX | Bis(2-phenoxyethyl)phosphine oxide. | 2 | 200 | do | CuCO₃ | |
| XXI | Bis(2-chloroethyl)phosphine | 3 | 200 | do | Na₂CO₃ | |
| XXII | Bis(3-hydroxypropyl)phosphine oxide. | 7 | 150 | do | C₆H₅CH₂N⁺(CH₃)₃OH⁻ | |
| XXIII | Bis(3-ethylthiopropyl)phosphine | 9 | 200 | do | LiOH | |
| XXIV | Bis(carbamylethyl)phosphine | 8 | 225 | do | MgO | |
| XXV | Bis(2-butoxyethyl)phosphine oxide. | 2 | 200 | do | None | |
| XXVI | Bis(3-chloropropyl)phosphine | 6 | 157 | n-Hexanol | Li₂CO₃ | |
| XXVII | Bis(hydroxymethyl)phosphine oxide. | 4 | 150 | None | None | |
| XXVIII | Bis(3-carbethoxypropyl)phosphine. | 5 | 200 | Diphenylether. | Cu powder | |
| XXIX | Bis(4-aminophenyl)phosphine oxide. | 2 | 200 | None | Tributylamine | |

[a] Carbonate:
1. Ethylene carbonate.
2. Propylene carbonate.
3. Phenylethylene carbonate.
4. 6-ethoxy-1,2-hexylene carbonate.
5. 6-cyano-1,2-hexylene carbonate.
6. 3-butoxy-1,2-propylene carbonate.
7. 2,3-butylene carbonate.
8. 1,2-cyclohexylene carbonate.
9. Cyclohexylethylene carbonate.

[b] The products of Examples IX and XI are, respectively:

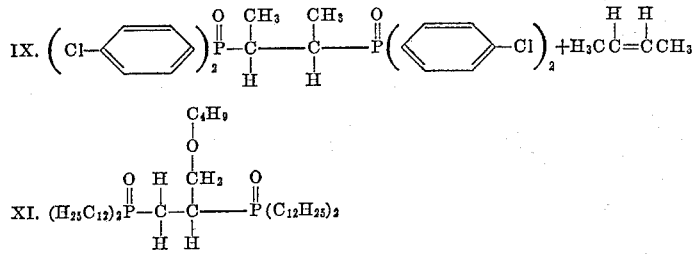

As is evident, these products correspond to Formulae III and IV, above; likewise, the products of Examples X and XII-XXIX corresponds to Formulae III and IV.

[c] Hexamethylbiguanide.

Examples IX through XXIX are carried out under the conditions given in Table II, above. Furthermore, the mixing sequence and recovery methods described hereinabove relative to Examples I–VIII are likewise employed in Examples IX through XXIX.

The novel alkylene diphosphine dioxides of the present invention have direct utility as gasoline additives. For example, up to about 10 milliliters of any one of these alkylene diphosphine dioxides, when dissolved in one gallon of gasoline, affords protection against misfiring, surfact ignition, and the like.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:

1. A process which comprises reacting an organophosphorous compound of the formula $$RR_1PH \atop (I) \quad (O)_n$$

with a cyclic carbonic ester selected from the group consisting of

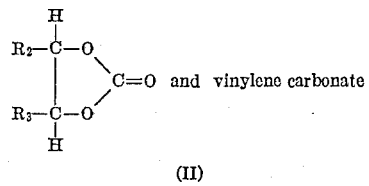

and vinylene carbonate at a temperature in the range of 50° C. to 250° C. to produce a member selected from the group consisting of

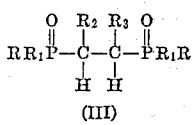

and a mixture of

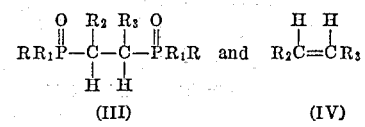

wherein n in Formula (I), above, is selected from 0 and 1; R and R₁ each represent a member selected from the group consisting of alkyl having from 1 to 20 carbon atoms, substituted alkyl having from 1 to 20 carbon atoms, cyclopentyl, cyclohexyl, phenyl, and R and R₁ taken together with P represent a member selected from the group consisting of 2,4,6-tris(3-heptyl)1,3-dioxa-5-phosphacyclohexyl, 2,4,6 - tri(4-chlorophenyl)1,3-dioxa-5(2-cyanoethyl)phosphacyclohexyl, 2,4,6 - tri(1-phenyl)1,3-dioxa-5(4-methylphenyl)phosphacyclohexyl, said substituents for alkyl, above, being selected from the group consisting of lower alkoxy, halogen, phenoxy, hydroxyl, carbamyl, cyano and phenyl; R₂ represents a member selected from the group consisting of hydrogen, alkyl having from 1 to 16 carbon atoms, and substituted alkyl having from 1 to 16 carbon atoms; R₃ represents a member selected from the group consisting of hydrogen, alkyl having 1 to 16 carbon atoms and substituted alkyl having from 1 to 16 carbon atoms; said substituents for R₂ and R₃ being selected from the group consisting of cyano and lower alkoxy.

2. 

References Cited in the file of this patent

UNITED STATES PATENTS

| | | |
|---|---|---|
| 2,642,461 | Morris et al. | June 16, 1953 |
| 2,953,596 | Rauhut et al. | Sept. 20, 1960 |
| 2,957,931 | Hamilton et al. | Oct. 25, 1960 |

OTHER REFERENCES

Berlin et al.: Chemical Reviews, vol. 60, June 1960, pages 244–249.

UNITED STATES PATENT OFFICE
CERTIFICATE OF CORRECTION

Patent No. 3,145,227                      August 18, 1964

Martin Grayson et al.

It is hereby certified that error appears in the above numbered patent requiring correction and that the said Letters Patent should read as corrected below.

Column 1, lines 23 to 29, to the right of the formula insert -- or vinylene carbonate --; column 2, line 42, for "$C_6H_5CH_2N^+(CH_3)_3OH^-$" read -- $C_6H_5CH_2N(CH_3)_3OH$ $^+$ $^-$ --; column 3, line 51, for "(21° C'-23° C.)" read -- (21° C.-23° C.) --; column 4, line 28, for "192° C.-198° C." read -- 195° C.-198° C. --.

Signed and sealed this 23rd day of March 1965.

(SEAL)
Attest:

ERNEST W. SWIDER                          EDWARD J. BRENNER
Attesting Officer                          Commissioner of Patents